United States Patent

Korcz

Patent Number: 5,171,438
Date of Patent: Dec. 15, 1992

[54] AQUARIUM FILTRATION SYSTEM

[76] Inventor: Robert L. Korcz, 2015 E. 27 St., Brooklyn, N.Y. 11229

[21] Appl. No.: 737,487
[22] Filed: Jul. 30, 1991
[51] Int. Cl.⁵ .............................................. A01K 63/04
[52] U.S. Cl. .................................. 210/169; 210/416.2; 119/5
[58] Field of Search ................. 210/169, 416.2; 119/4, 119/5

[56] References Cited

U.S. PATENT DOCUMENTS

| | | | |
|---|---|---|---|
| 3,768,652 | 10/1973 | Jardim | 210/169 |
| 3,774,766 | 11/1973 | Brock | 210/169 |
| 4,606,821 | 8/1986 | D'Imperio | 210/169 |
| 4,684,462 | 8/1987 | Augustyniak | 210/169 |
| 4,844,013 | 7/1989 | de Haan et al. | 119/5 |
| 4,851,112 | 7/1989 | Schlensker | 210/169 |
| 4,915,828 | 4/1990 | Meyers et al. | 210/169 |
| 4,988,436 | 1/1991 | Cole | 210/169 |

Primary Examiner—Stanley S. Silverman
Assistant Examiner—Robert James Popovics
Attorney, Agent, or Firm—Lowell M. Rubin

[57] ABSTRACT

An aquarium filtration system, biological and mechanical in nature, having the capability to include chemical filtration. The system uses high-density biological filter elements in a series of chambers operated by a single pump. Both aerobic and anaerobic bacteria colonies are used for water filtering.

7 Claims, 3 Drawing Sheets

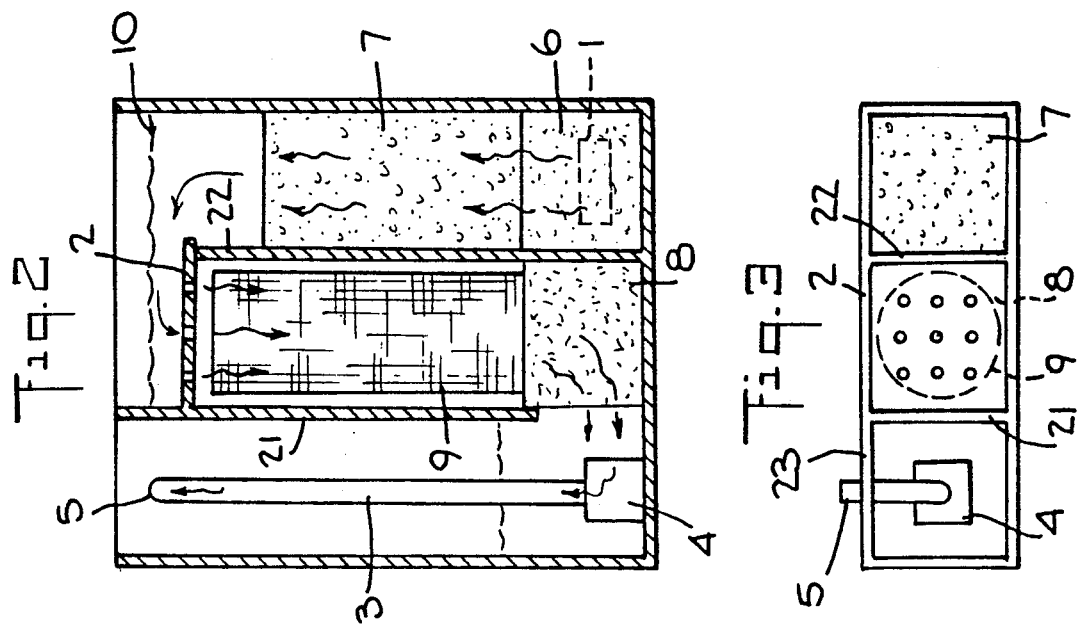
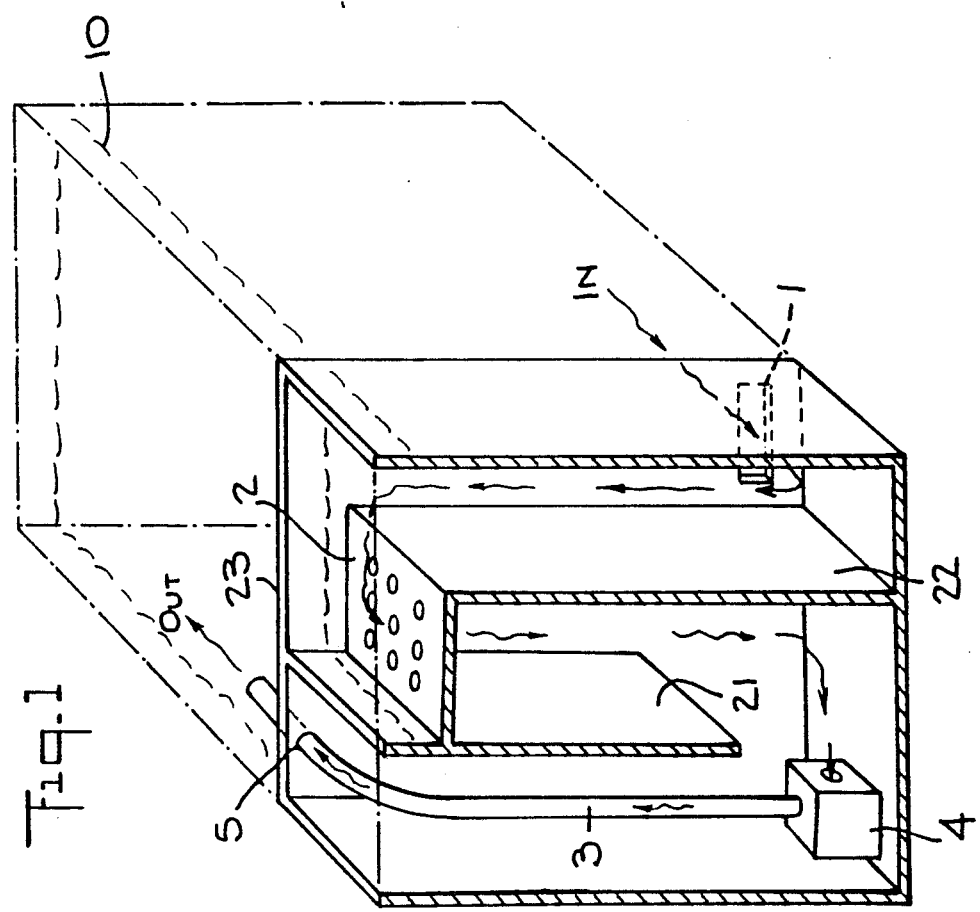

AQUARIUM FILTRATION SYSTEM

BACKGROUND OF THE INVENTION

The present invention relates to an improvement in aquarium filter systems. Aquarium filter systems are well known in the art. The various processes which must be maintained in order to provide a satisfactory environment for marine life have been defined in detail. The filter units which have formed the prior art have grown exceedingly complex, and are costly to obtain and maintain.

Accordingly, it is an object of this invention to provide an aquarium filter system which is of simple design which leads to inexpensive manufacture and a low cost to the user which may, in turn, bring new hobbyists to the field.

It is a further object of this invention to provide a filter system which requires low maintenance under normal operations.

It is a further object of this invention to provide a system which is purely biological and mechanical, but which can readily be converted to incorporate chemical filtering should such chemical filtering becomes required.

It is a further object of this invention to provide a filter system which is compact and which can be installed as part of a marine aquarium or as a separate unit.

It is a further object of this invention to provide a more rapid cycle time due to the filter system's unique design.

PRIOR ART

There are many types of aquarium filtration systems available today. Most incorporate a combination of mechanical and chemical filtration. Some also have biological filtration. Some common forms of filter systems and their problems are:

Under-gravel filter—filter medium cannot be easily cleaned and may foul the tank. Generally takes a long time to cycle (i.e. the time required for a biological filtration media to have sufficient bacterial colonies to effectively filter aquarium water.)

Canister filter—has no aerobic chamber. Chemical filtration is used, usually carbon. Carbon has no place in a marine invertebrate system as it removes valuable trace elements from seawater. Canister filters are difficult to clean.

Parallel filtration systems—these systems are complex and difficult to maintain. It is difficult to ascertain if they are working properly (clogs in one area of a parallel system are not apparent as water flows through the other parts.) All water entering into the filter system is not acted upon by each filtration element on each pass-through.

Modern biological systems—these systems include protein skimming, ozone filtration, bioballs, etc. Most of these systems work but are very expensive and bulky. Some may be as large as the aquarium they filter.

What is needed is a filtration system that is simple in design, easy to maintain, inexpensive to run, requires no media change in normal operation, has dense biological mass, is both aerobic and anaerobic in nature, runs with a single pump in a serial fashion, and has a high water transfer rate by a relatively long transit time through biological filtration media to give bacteria a chance to filter out ammonia, nitrites, nitrates, etc., from the aquarium water. The present invention meets and exceeds these criteria. In addition to the above, this invention will cycle faster than any of the other biological systems mentioned. Depending on conditions, conventional systems may take up to six months to fully cycle in a marine environment. This invention has cycled in one month or less.

SUMMARY OF THE INVENTION

The present invention is primarily designed for marine (salt water) invertebrate and fish aquariums, although it will work equally well in fresh water aquariums. The system is mechanical and biological in nature. Chemical filtration is generally undesirable in a marine environment as it will remove beneficial trace elements from the filtered water. However, this invention does have the ability to incorporate chemical filtering should it become required due to accidental chemical poisoning of the aquarium or if the filtering system is inadvertently shut down for a significant period.

This invention makes use of high biological mass in order to develop a compact aquarium filtration system. This is accomplished by using a unique medium in the aerobic drip filtration chamber, a relatively dense PERLON TM or monofilament fiber material which may be incorporated into a cylinder or loosely packed in the aerobic chamber. The anaerobic chamber is unique because it is reverse flow in design, will present no dead spots and the filter element functions longitudinally allowing aquarium water longer contact with anaerobic filter medium as it passes through the filtration system.

BRIEF DESCRIPTION OF THE DRAWINGS

FIG. 1 is a perspective view of the present invention formed as an integral subdivision of an aquarium.

FIG. 2 is an elevation of a section taken through the filter system.

FIG. 3 is a plan view of the filter system as seen from above.

DETAILED DESCRIPTION OF THE PREFERRED EMBODIMENT

Figure 4:
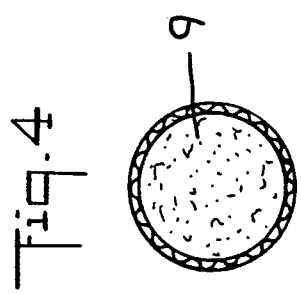
FIG. 4 is a plan view of one embodiment of the aerobic filter media.

FIGS. 1, 2 and 3 depict the form of the invention integral to an aquarium. The filtration system is formed at one end of the aquarium by the wall (23) which extends the full width and height of the aquarium. As shown in the elevation and plan figures, the filter system is separated into three functional elements by the transverse walls (21) and (22). The area formed by wall (22) and the exterior aquarium wall is the anaerobic chamber. The area between the two wall (21) and (22) is the aerobic chamber and the remaining area between wall (21) and the exterior aquarium wall is the pumping chamber. The wall (22) extends from the bottom of the filter section to a point near to but below the intended level of water in the aquarium (10). The wall (21) in turn extends downwardly from the top of the aquarium wall, past the top of wall (22) to a point below the top of secondary anaerobic filter (8). Resting on the top of wall (22) and extending to meet pendant wall (21) is the dispersion plate (2). Dispersion plate (2) is pierced by a number of holes, sized and configured as noted below.

Water from the main aquarium enters the filter unit through an opening formed near the bottom of wall (23) in the area of the anaerobic chamber. Water will first rise through a pre-filter (6) and into an anaerobic filter foam block (7). Water will tend to continue rising until the water level in the anaerobic meets the tank water level (10). If chemical filtering is required it can be inserted at the top of the anaerobic block (7). The steady state water level will rise above the dispersion plate (2) and commence to trickle through said plate and on to the aerobic filter element (9). Water will trickle through the aerobic filter (9) and into a secondary anaerobic filter block (8). Water will pass out of the secondary anaerobic filter block into the bottom of the pumping chamber where it will be returned to the top of the aquarium by submersible pump (4) through the tube (3) and outlet elbow (5).

Looking in detail at the filter operation, water entering input port (1) from the tank is pulled in near the bottom of the tank where debris tends to collect (uneaten food, solid fish waste, dead plants, etc.) These debris are trapped in pre-filter (6) where they decompose. If pre-filter (6) become clogged, it is easily removed by first removing anaerobic filter (7) and then lifting out filter (6). It can then be rinsed in tap water and returned to the filter.

After the water has deposited the debris in pre-filter (6) oxygen starved water travels through anaerobic filter foam block (7) in a direction parallel to the long axis of the element. Due to the fact that water is percolating upward through the foam block it will tend to use the entire area of the block rather than the opposite configuration where water is deposited on top of a block and tends to penetrate directly without dispersion. This makes for more efficient filtering.

Water now rises to the level (10) in the aquarium and covers the dispersion plate. The dispersion plate is so constructed that the water passing through the openings in said plate drips down the length of the aerobic filter element (9). The trickling action associated with the passage of water through the dispersion plate will aid in the absorption of oxygen and the release of nitrogen gas. Oxygen laden water now trickles through the aerobic filter medium where aerobic microbe colonies remove harmful ammonia from the water and convert them to less harmful nitrites.

Figure 5:
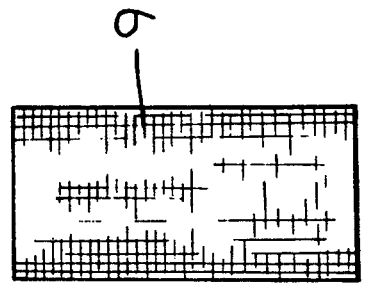
FIG. 5 is an elevation of an aerobic filter media.

FIGS. 4 and 5 are respectively plan and elevation views of the aerobic filter. The unique design of the aerobic filter medium enables high biological mass and density in a relatively small area. The aerobic cylinder consists of a central core of coarse PERLON TM or monofilament fiber material surrounded by a cylindrical frame of DLS TM or nylon screen material. Air easily passes through the cylinder as water trickles through it allowing sufficient oxygen for aerobic colonies to exist in quantity.

After passing through the aerobic filter element the water will pass through the secondary anaerobic filter element (8). This element may contain both aerobic and anaerobic bacterial colonies and performs the secondary function of supporting the aerobic filter element (9) clear of water. After transiting the secondary anaerobic filter, water passes into the pumping chamber and to the submersible pump (4) where it will be pumped through tube (3) and outlet elbow (5) back into the aquarium either directly or through an added spray bar. The action of the water return serves to agitate the surface of the water in the aquarium portion to increase the effective surface area. The action of circulating water in the aquarium by drawing water through an input port near the bottom and returning it to the surface will aid in eliminating dead spots of uncirculated water.

The openings in the dispersion plate (2) are cooperatively sized with the capacity of the submersible pump (4), which may also be adjustable, to initially maintain the water level in the pumping chamber at or slightly above the top of the secondary anaerobic filter element (8). The length of the pendant dividing wall (21) is sized to reach a point slightly below the top of the anaerobic block (8). This effectively forces the water which has passed through dispersion plate (2) and the aerobic filter (9) into said secondary anaerobic filter.

In ordinary aquarium use the total volume of water will gradually decrease due to evaporation. Such a decrease in water volume will result in a gradual lowering of the water level at the secondary anaerobic filter element (8) and the submersible pump (4). The lowering of the water level will cause a portion of said anaerobic element to go aerobic. This effect will be reversed when the aquarium water is replenished. In use it has appeared that this periodic change in water level, causing the secondary anaerobic filter element to go partially aerobic and then to return to the anerobic condition has increased the efficiency of the filter system and reduced the biological cycle time. In particular, water percolating down through, or along the surface of, the aerobic filter (9) will tend to collect remaining protein material. As the water level at the secondary anaerobic filter (8) decreases this protein material is deposited on, and trapped by said secondary anaerobic filter. This protein material is thereafter decomposed providing the invention with an added capability to function as an equivalent protein skimmer without the requirement of additional equipment or cleaning.

Figure 6:
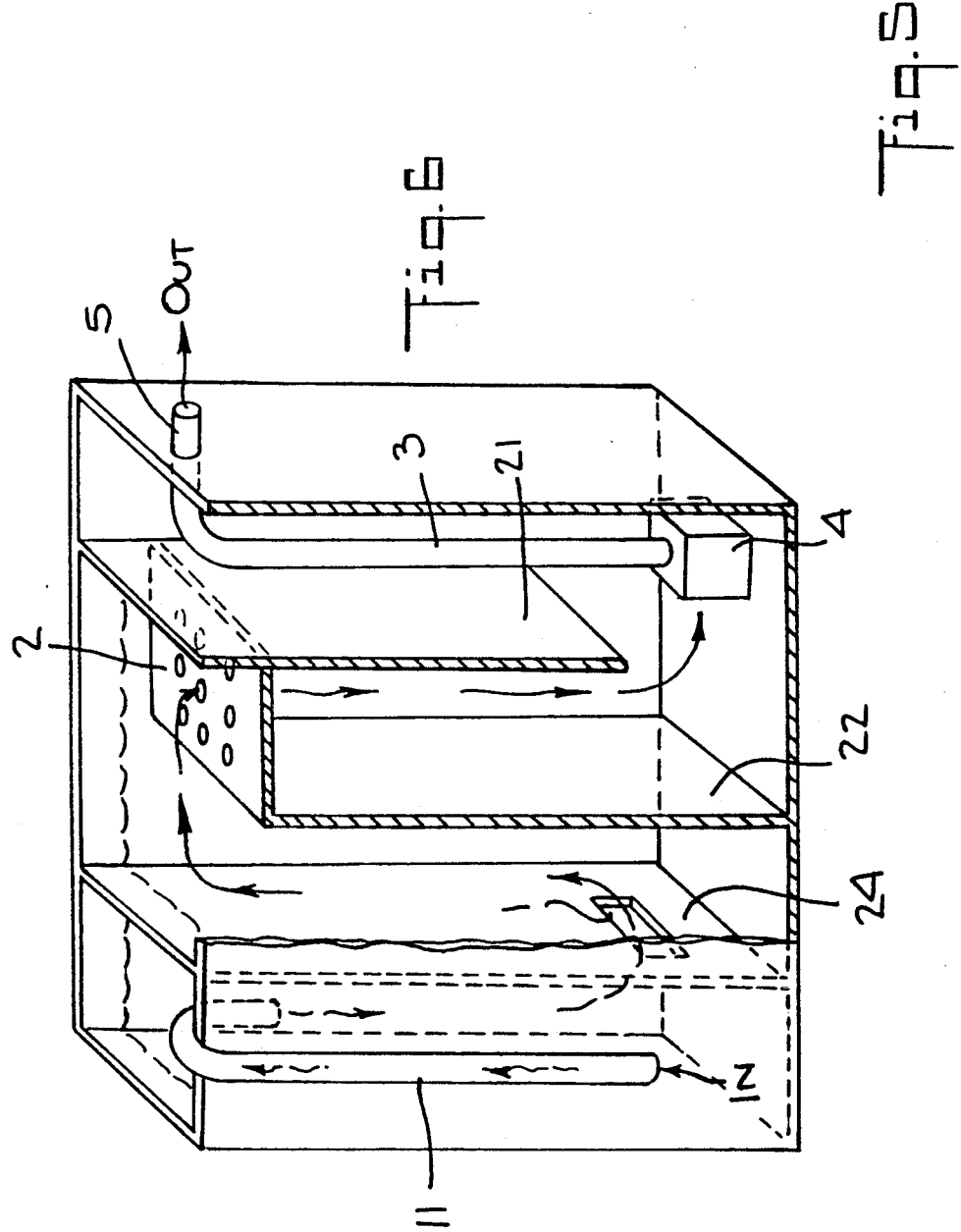
FIG. 6 is a perspective view of an alternate embodiment of the filter system in which the unit is separate from the aquarium.
Figure 7:
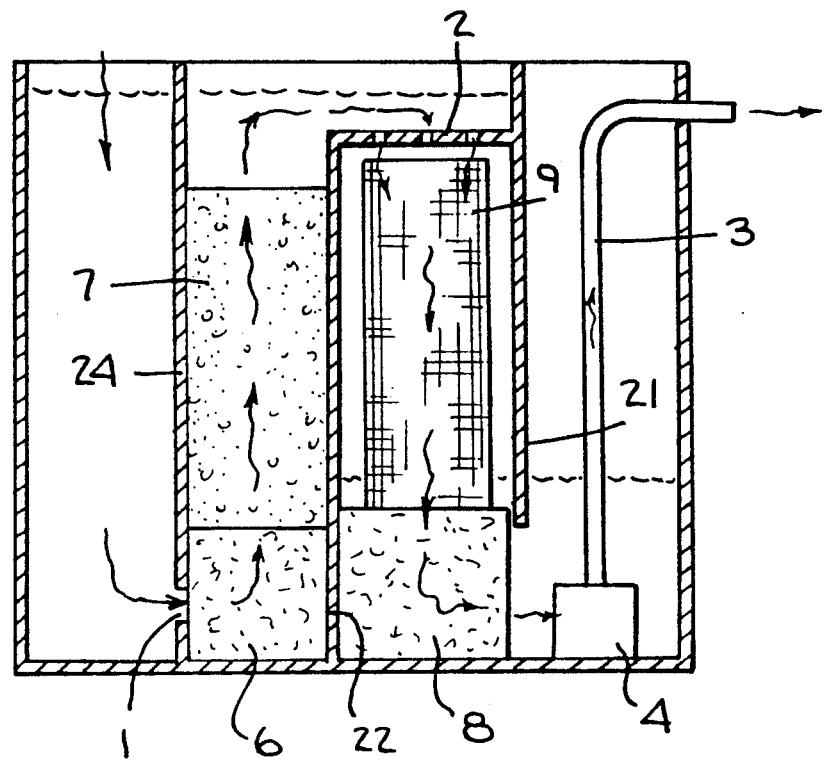
FIG. 7 is a sectional elevation of the separate filter system.
Figure 8:
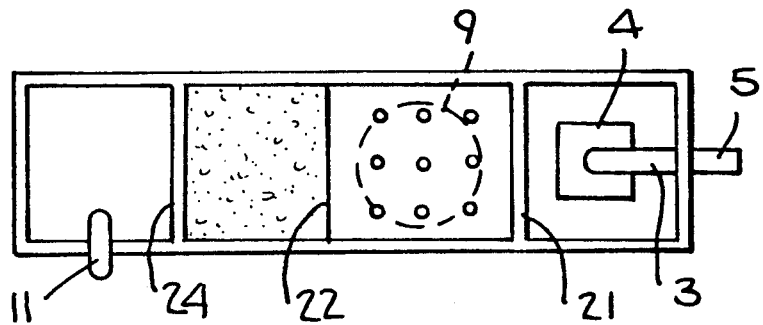
FIG. 8 is a plan view of the separate filter system seen from above.

FIGS. 6, 7 and 8 depict the corresponding installation in a filter system which is separate from the aquarium. While the operation of the filter system is identical to that described for the integral filter system, the separate filter system has a fourth compartment into which aquarium water is received.

Viewing FIGS. 6, 7 and 8 it can be seen that an added wall element (24) creates a fourth filter chamber. Aquarium water is brought to this input chamber through any of the means well known in the art. In the depicted embodiment a siphon tube (11) draws water from the lower levels of the aquarium to be filtered and fills the filter input chamber until the water level matches the aquarium water level. The input port (1) is now located toward the bottom of this added wall element (24). In all other respects the separate filter system functions in a manner identical to the integral system whose operation was described above. The output elbow (5) is shown emerging from the end of this filter embodiment but it is understood that this is intended to return filtered water to the cooperating aquarium and this elbow will be connected through appropriate means, known in the art, to accomplish this task.

What is claimed is:

1. An aquarium and integral filter system, the combination comprising:
   an aquarium portion;
   a filter portion;

said filter portion being divided from said aquarium portion by a first partition;

said filter portion being divided into three chambers by a second partition and a third partition;

the first said chamber, having an anaerobic filter means contained therein, and having means for the entry of water from said aquarium portion into the bottom of said first chamber and means for the exit of water at the top thereof, wherein said means for the entry of water from said aquarium portion into the bottom of said first chamber is an opening cut into the bottom portion of said first partition;

the second said chamber, having an aerobic filter means contained therein, said second chamber being in fluid communication with the water leaving the top of the first said chamber and having means to control the flow of said water from the first said chamber onto said aerobic filter, and the said second chamber having means for the exit of said water at the bottom thereof;

the third said chamber being in fluid communication with the second said chamber and having a pumping means for returning said water exiting the bottom of the said second chamber to the said aquarium portion.

2. The combination described in claim 1 wherein:

the said first chamber includes a pre-filter means between said anaerobic filter means and said entry means for water from said aquarium portion; and the said second chamber includes a secondary anaerobic filter means supporting the said aerobic filter means; and the said pumping means being a submersible pump.

3. The combination described in claim 2 wherein:

said first chamber is formed on one side by the said first partition dividing the aquarium portion from the filter portion; and said second partition separating said first chamber from said second chamber extends from the bottom of said filter portion to a level below the level of said water in said aquarium portion; and said third partition separating said second chamber from said third chamber extends from the top of said filter portion to a level below the top of the said secondary anaerobic filter means.

4. The combination described in claim 3 wherein:

said mean controlling the flow of said water from the first said chamber onto said aerobic filter is a dispersion plate pierced by a number of holes, said holes being sized to function in cooperation with said submersible pump to initially maintain the level of said water in the second said chamber at the top of said secondary anaerobic filter mean.

5. The combination described in claim 4 wherein:

the level of said water in said second chamber is allowed to decrease below the top of the said secondary anaerobic filter means and said secondary anaerobic filter means functions as a protein skimmer means.

6. An aquarium filtration system comprising:

a structure divided into four chambers by a first partition, a second partition and a third partition;

the first said chamber having means for drawing water from the bottom of an associated aquarium into said first chamber;

the second said chamber, having an anaerobic filter means contained therein, and having means for the entry of water from said first chamber into the bottom of said second chamber and means for the exit of water at the top thereof, and including a pre-filter means between said anaerobic filter means and said entry means for water from said first chamber;

the third said chamber, having an aerobic filter means contained therein, and having a secondary anaerobic filter means supporting the said aerobic filter means, said third chamber being in fluid communication with the water leaving the top of the second said chamber and having means to control the flow of said water from the second said chamber onto said aerobic filter, and the said third chamber having means for the exit of said water at the bottom thereof;

the fourth said chamber being in fluid communication with the third said chamber and having a pumping means for returning said water exiting the bottom of the said third chamber to the said aquarium, said pumping means being a submersible pump.

7. The combination described in claim 6 wherein:

said means for the entry of water from said first chamber into the bottom of said second chamber is an opening cut into the bottom portion of the said first partition; and said second partition separating said second chamber from said third chamber extends from the bottom of said filter portion to a level below the level of said water in said first chamber; and said third partition separating said third chamber from said fourth chamber extends from the top of said filter portion to a level below the top of the said secondary anaerobic filter means.

* * * * *